R. RANKIN.
ELECTRIC GENERATOR AND MOTOR.
APPLICATION FILED DEC. 15, 1920.

1,393,038.

Patented Oct. 11, 1921.

INVENTOR
ROBERT RANKIN
by Spear, Middleton, Donaldson & Hall
ATTORNEYS

UNITED STATES PATENT OFFICE.

ROBERT RANKIN, OF LEAMINGTON SPA, ENGLAND.

ELECTRIC GENERATOR AND MOTOR.

1,393,038.        Specification of Letters Patent.     Patented Oct. 11, 1921.

Application filed December 15, 1920. Serial No. 430,919.

*To all whom it may concern:*

Be it known that I, ROBERT RANKIN, a subject of the King of England, residing at Leamington Spa, in the county of Warwick, England, have invented certain new and useful Improvements in Electric Generators and Motors, of which the following is a specification.

This invention has for its primary object to provide a simple form of self-regulating machine suitable, as a generator, for stationary use, or for use on trains and vehicles for supplying a load and for charging accumulators. A secondary object is to provide means whereby such a machine can also be used as a motor for engine starting.

According to this invention, a machine is used such that the magnet frame is, in one direction, free to move to a limited extent angularly around the axis of the armature against the action of a spring which creates a suitable resistance, and in the opposite direction to rotate freely unless held by a braking device. Thus, in the first case, when generating, as the current output tends to increase, the field system moves relative to the brushes in the same direction as the armature and the tendency for the current to rise is resisted, and when, in using the machine as a starting motor, the armature, for a certain period is held stationary, the field system may revolve in a direction opposite to the normal direction of rotation of the armature. Thus, to use the machine as a starting motor, current is supplied to the armature and to the field system causing the latter to revolve freely in the first instance because the armature is held stationary owing to a greater resistance to its motion than that opposing motion of the fields, the brush gear being then automatically held to the magnet frame in the right position. When the magnet frame is revolving it is gradually arrested by means of a brake or clutch, the reactive torque then causing the armature to revolve, thus supplying a torque to start the engine.

The machine may be either shunt or compound wound.

The invention is capable of a considerable amount of modification in its general and detail arrangement, and for this reason the accompanying drawings are to be regarded as a purely diagrammatic representation of one method of carrying it out for use as a combined generator and starting device for internal combustion engines, wherein—

Figure 1:
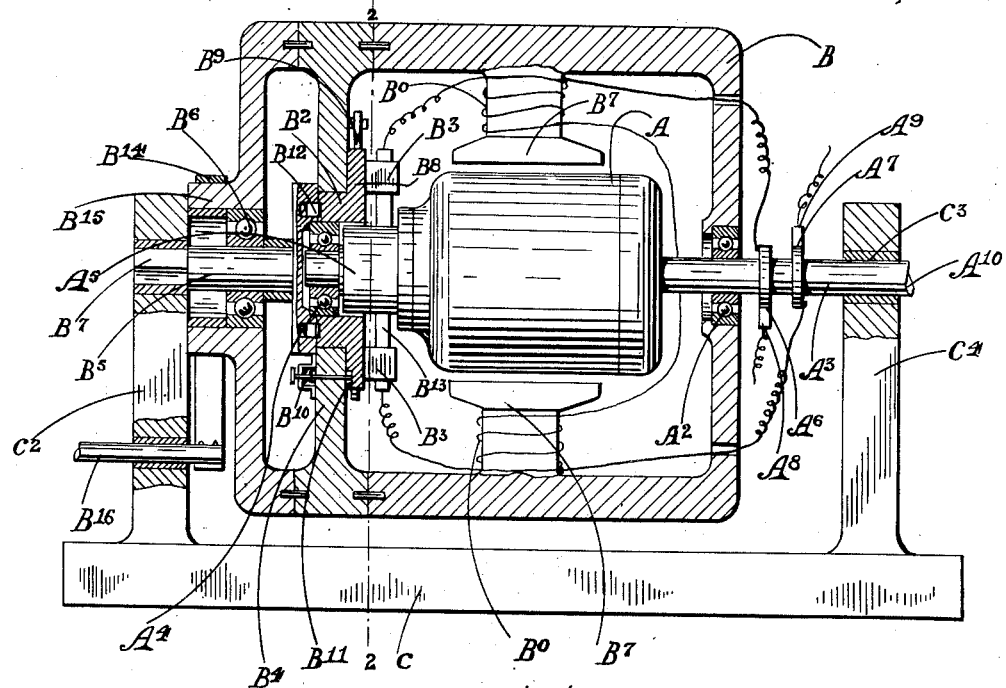
Figure 2:
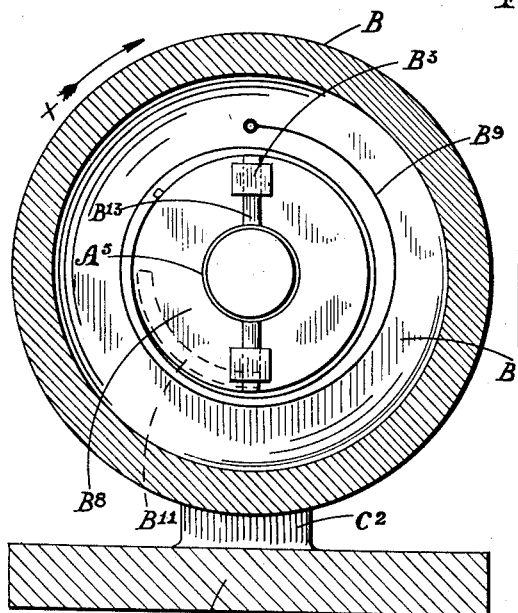
Figure 3:
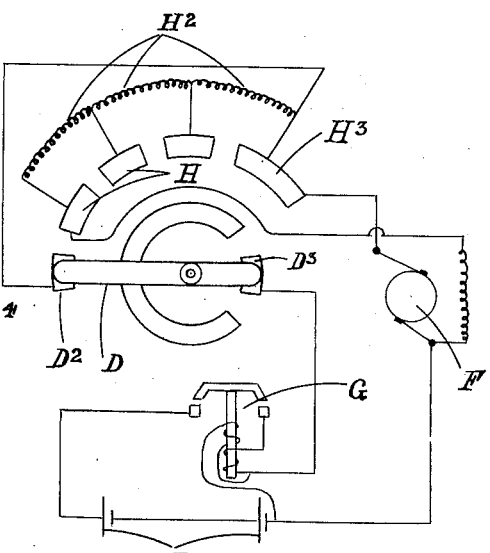

Figure 1 is a sectional side elevation of the complete machine, only a shunt winding being shown, Fig. 2 is a cross section upon the line 2. 2. of Fig. 1 as seen from the right side thereof, the arrow X showing the direction of rotation of the armature, and Fig. 3 is a wiring diagram for the machine.

The armature A is arranged in a pair of bearings, one of which $A^2$ is situated between the armature shaft $A^3$ and a part of the magnet frame B. The bearing $A^4$ at the outer end is between the armature shaft and a sleeve $B^2$ carrying the brush gear $B^3$. This sleeve $B^2$ is supported by a disk $B^4$ forming part of or attached to the magnet frame B, and is axially alined with a stem $B^5$ carrying a bearing $B^6$ on which the adjacent end of the magnet frame is mounted. The outer end of this stem may be supported and held against rotation in a standard $C^2$ extending from a base plate C, and the extreme opposite end of the armature shaft is rotatably mounted in any other suitable bearing, such as the bearing $C^3$ carried by the standard $C^4$ on the base plate C. The magnet frame B carries the poles $B^7$ as well as the above mentioned disk $B^4$, adjacent to which is the brush gear $B^3$, the sleeve $B^2$ having for the latter's support, a flanged part $B^8$. To this flange is attached one end of a flat spiral spring $B^9$, the other end of which is connected to the disk $B^4$ and thus to the field system. A spring plunger $B^{10}$ extends through the disk $B^4$ bearing against the bottom of a groove $B^{11}$ located in the adjacent face of the flanged part $B^8$ of the brush carrying sleeve $B^2$. This groove $B^{11}$ is curved concentrically to the armature axis and contact of the plunger $B^{10}$ with its ends limits in each direction the relative angular movement of the brush gear and poles $B^7$ of the magnets. The extent of this angular movement is such as is necessary for maintaining a substantially constant current at any rotational speed above a prescribed value.

The sleeve $B^2$ is held against rotation in the direction of the armature's movement (which is the same whether the machine acts as a generator or a motor) by means of a ratchet and pawl device indicated at $B^{12}$, one of the coöperating members of which is carried in a radial flange extending from the non-rotatable stem $B^5$. In this way the sleeve $B^2$ is retained in a fixed angular position in one direction, but, driven by the field system, can rotate freely in the opposite one. The sleeve $B^2$ carries brushes $B^{13}$ coöperating with a commutator and connected to windings $B^6$ on the field poles $B^7$ and to slip rings $A^6$, $A^7$ on the armature shaft $A^3$, from which the current is led by brushes $A^8$, $A^9$ to or from accumulators indicated at E in the wiring diagram Fig. 3.

The armature shaft at its end $A^{10}$ is geared by any suitable means to the engine and when as a generator it is rotated above a certain speed, an approximately constant current output is obtained owing to the fact that any tendency for the current to increase in value is checked by a change of position of the brushes relative to the field poles. This effect is due to the field system being dragged around angularly by the armature against the pull of the spring $B^9$ to an extent dependent upon the armature current while the brushes remain stationary, thereby controlling the voltage across the brushes in the known manner.

If, for use of the machine as a motor, a current is supplied from the accumulators to the armature and field, with the armature stationary, the field system will revolve in the direction opposite to that in which the armature would be driven by the engine, and carries with it the brush gear sleeve, which by reason of the ratchet and pawl device $B^{12}$ is free to rotate in that direction. Any tendency from the friction between the brushes $B^{13}$ and the commutator $A^5$ to cause the sleeve to lag and allow the magnets to move in relation to the brush gear is overcome by the provision of the spring plunger $B^{10}$ which by its engagement with the end of the slot $B^{11}$, constitutes a driving pin and also prevents the spring $B^9$ from unwinding. As soon as the field system has reached its maximum speed, a braking action is applied by a brake $B^{14}$ around a boss $B^{15}$ on the field system in order to slow it down gradually, the armature then commencing to revolve and speeding up in proportion as the field slows down.

When the engine starts and the armature is rotated by it as a generator, the magnets, as forming the field system, are drawn round with the armature by magnetic drag against the tension of the spring $B^9$ connecting the magnets and the brush gear sleeve, which latter is held against rotation in the direction of movement of the armature by the agency of the ratchet and pawl $B^{12}$ already mentioned, or other suitable device. The brush gear being thus held stationary, the magnetic drag of the armature acting upon the fields in proportion to the current circulating through it draws them around against the action of the spring $B^9$ so that relatively the brushes are retarded and the output of the machine is kept substantially constant.

Conveniently, the brake applying device, constituted by a shaft $B^{16}$, may be coupled to, or form the spindle of a switch D, which under the action of a spring, tends normally to close a pair of contacts $D^2$, $D^3$, whereby the generator charges the accumulators or supplies the load through a cut-out. This is shown in the wiring diagram Fig. 3 in which the accumulators are seen at E, the generator and motor at F, an automatic cut-out at G, and a series of starting contacts and resistances at H, $H^2$. As illustrated, the diagram represents the conditions which would obtain if the armature of the machine was either stationary or was being rotated at a speed insufficient to create the output necessary to close the cut-out contacts at G and supply current to the external circuit.

In employing the machine as a motor, to start the engine it will be seen from the diagram that when the switch D is moved from its normal position, it bears upon the first of the contacts H whereby the accumulator is switched on to the motor through the whole of the resistances, the field windings being also supplied with current by the same movement. As the switch lever is moved over the succeeding contacts, the resistance is decreased and finally is cut out, and the braking action is then effected during the continued movement of the switch along the last contact $H^3$ which is of a sufficient length for this purpose. When the switch D is released, which is the case when the engine starts, it returns automatically to the first position as illustrated, in which the machine then acting as a generator, charges the accumulators or supplies the load.

If desired, the armature shaft $A^3$ may be connected at $A^{10}$ with the engine through some known form of gear which automatically provides a choice of ratios according to whether the armature is driving or driven.

It will be understood that the slip rings $A^6$, $A^7$ will be arranged in such manner, (and be reduplicated if necessary), that they are capable of connection to fixed brushes constituting the junction with the external circuit, and, also to brushes carried by the field system, without risk of fouling in any way, when the latter is rotating.

What I claim as my invention and desire to secure by Letters Patent of the United States is:—

1. In an electric machine, the combination of a rotating armature, a commutator on said armature, brushes engaging said commutator, a field system normally stationary but adapted to revolve freely in one direction and to move through a limited angle in the opposite direction, a spring acting to oppose such limited angular movement, and a brake adapted to hold said field system against rotation, substantially as set forth.

2. In an electric machine, the combination of a rotating armature, a commutator on said armature, brushes engaging said commutator, a field system normally stationary but adapted to revolve freely in one direction and to move through a limited angle in the opposite direction, a brush-carrying member adapted, in company with said field system, to rotate in one direction freely about the armature axis, and in the opposite direction to be held against rotation, a spring connecting said brush carrying member with said field system thereby to resist the latter's limited angular movement, a stop adapted to limit the relative angular movement of said field system and said brush carrying member, and a brake adapted to hold said field system against rotation, substantially as set forth.

3. In an electric machine, the combination of a rotating armature, a commutator on said armature, brushes engaging said commutator, a field system normally stationary but adapted to revolve freely in one direction and to move through a limited angle in the opposite direction, a brush-carrying member adapted, in company with said field system, to rotate in one direction freely about the armature axis, and in the opposite direction to be held against rotation, a spring connecting said brush carrying member with said field system thereby to resist the latter's limited angular movement, a stop adapted to limit the relative angular movement of said field system and said brush carrying member, a brake adapted to hold said field system against rotation, a switch adapted to connect said electric machine with a current supply, and an operative connection between said switch and said brake whereby continued movement of the switch, after closing the electrical circuit, applies the brake, substantially as set forth.

4. In an electric machine, the combination of a rotating armature, a commutator on said armature, brushes engaging said commutator, a field system normally stationary but adapted to revolve freely in one direction and to move through a limited angle in the opposite direction, a brush-carrying member adapted, in company with said field system, to rotate in one direction freely about the armature axis, and in the opposite direction to be held against rotation, a spring connecting said brush carrying member with said field system thereby to resist the latter's limited angular movement, a stop adapted to limit the relative angular movement of said field system and said brush carrying member in either direction of rotation, a brake adapted to hold said field system against rotation, a switch adapted to connect said electric machine through a variable resistance with a current supply, and an operative connection between said switch and said brake whereby continued movement of the switch, after closing the electrical circuit and cutting out the last resistance, applies the brake, substantially as set forth.

5. An electrical machine as claimed in claim 4, having a ratchet and pawl mechanism adapted to connect the brush carrying member with a fixed member in such manner that said brush carrying member can rotate in one direction only, substantially as set forth.

In testimony whereof I have signed my name to this specification in the presence of two subscribing witnesses.

ROBERT RANKIN.

Witnesses:
E. E. ROSAMOND,
J. L. STANLEY.